US 8,469,523 B2

(12) United States Patent
Sakai et al.

(10) Patent No.: US 8,469,523 B2
(45) Date of Patent: Jun. 25, 2013

(54) ILLUMINATION APPARATUS AND PROJECTOR HAVING THE SAME

(75) Inventors: Kenshi Sakai, Azumino (JP); Kazuhiro Nishida, Sapporo (JP); Katsumi Tanaka, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 244 days.

(21) Appl. No.: 12/684,563

(22) Filed: Jan. 8, 2010

(65) Prior Publication Data

US 2010/0177287 A1    Jul. 15, 2010

(30) Foreign Application Priority Data

Jan. 15, 2009   (JP) ................. 2009-006332

(51) Int. Cl.
*G03B 21/26* (2006.01)
*G03B 21/28* (2006.01)
*G02B 5/08* (2006.01)
*G02B 7/182* (2006.01)
*F21V 1/00* (2006.01)
*F21V 11/00* (2006.01)

(52) U.S. Cl.
USPC .............. 353/94; 353/99; 359/855; 359/871; 362/241

(58) Field of Classification Search
USPC ................ 353/94, 98, 99, 81; 359/638, 639, 359/833, 855, 871, 872; 362/234, 236, 241
See application file for complete search history.

(56) References Cited

U.S. PATENT DOCUMENTS

| 6,222,674 B1 | 4/2001 | Ohta |
| 6,464,375 B1 | 10/2002 | Wada et al. |
| 7,316,484 B2 * | 1/2008 | Hatakeyama ................. 353/102 |
| 2002/0030795 A1 | 3/2002 | Yamamoto |
| 2002/0033933 A1 * | 3/2002 | Yamamoto ...................... 353/94 |
| 2005/0024602 A1 * | 2/2005 | Shimaoka et al. .............. 353/94 |
| 2009/0116117 A1 | 5/2009 | Sakai |

FOREIGN PATENT DOCUMENTS

| CN | 101118042 A | 2/2008 |
| JP | A 7-298166 | 11/1995 |
| JP | A 2000-330224 | 11/2000 |
| JP | A-2002-31850 | 1/2002 |
| JP | B2-3581568 | 10/2004 |
| JP | B2-4045692 | 2/2008 |

* cited by examiner

*Primary Examiner* — William C Dowling
*Assistant Examiner* — Ryan Howard
(74) *Attorney, Agent, or Firm* — Oliff & Berridge, PLC (57) ABSTRACT

An illumination apparatus includes: first and second lamps; and a combining mirror configured to combine emitted lights from the first and second lamps The combining mirror includes first and second reflection surfaces opposing the first and second lamps respectively, being abutted vertically with respect to each other, whereby forming an edge. Since optical axes of the first and second lamp are respectively inclined with respect to a reference axis being orthogonal to a system optical axis of the illumination apparatus, central axes of the lights from the first and second lamps are incident on a downstream optical system in a state of being slightly inclined with respect to the system optical axis after being reflected on the first and second reflection surfaces respectively.

11 Claims, 6 Drawing Sheets

FIG. 6

ILLUMINATION APPARATUS AND PROJECTOR HAVING THE SAME

BACKGROUND

1. Technical Field

The present invention relates to an illumination apparatus configured to form an illumination light by combining lights generated from a plurality of lamps and a projector having the illumination apparatus.

2. Related Art

In a field of a projector-type image display apparatus such as a projector, an apparatus configured to form a bright image using an illumination apparatus having two lamps is known (for example, see JP-A-2000-3612). In particular, as the illumination apparatus having the two lamps, an apparatus in which optical axes of reflectors of the lamps are inclined by a minute angle with respect to an optical axis of the illumination apparatus in order to improve an efficiency of light utilization is known (see JP-A-2002-31850).

However, as shown in JP-A-2002-31850 described above, in order to additionally incline the optical axis of the illumination apparatus with respect to the optical axes of the reflectors of the lamps by a minute angle when causing lights from the two lamps to be reflected in substantially the same direction using a prism type mirror and to be combined the same, a light reflection angle of the mirror needs to be taken into consideration. In this case, in the course of manufacturing the mirror, events such as generation of unproductive material which cannot be used or difficulties in fabrication of reflection surfaces may occur in order to achieve a desired reflection angle. For example, when fabricating the mirror using a reflection prism, unnecessary material may be generated when cutting a portion to be formed into the reflection surface, or formation of a reflection layer on the portion cut out to form the reflection surface may be difficult.

SUMMARY

An advantage of some aspects of the invention is to provide an illumination apparatus which achieves improvement of an efficiency of light utilization by combining lights generated from a plurality of lamps with optical axes thereof to form a minute angle with respect to an optical axis of the illumination apparatus with each other and a projector having such the illumination apparatus.

According to a first aspect of the invention, there is provided an illumination apparatus including: first and second lamps configured to emit light source lights generated respectively from first and second arc tubes so as to be reflected and condensed by first and second reflectors and arranged along a reference plane including a system optical axis of the entire apparatus in symmetry with respect to the system optical axis; and a combining mirror configured to combine emitted lights from the first and second lamps by reflecting the same in substantially the same directions, in which the combining mirror includes first and second reflection surfaces opposing the first and second lamps respectively, being oriented vertically with respect to the reference plane, being arranged in symmetry with respect to the system optical axis, and being abutted vertically with respect to each other, whereby forming an edge, an optical axis of the first lamp extends in a direction inclined in a positive angular direction at a predetermined angle with respect to a reference axis being orthogonal to the system optical axis on the reference plane and intersecting the optical axes of the first and second lamps on the first and second reflection surfaces, and an optical axis of the second lamp extends in a direction inclined in a negative angular direction at the same predetermined angle as the optical axis of the first lamp with respect to the reference axis.

In the illumination apparatus described above, the first and second reflection surfaces of the combining mirror are abutted vertically with each other, and the optical axes of the first and second lamps extend in a state inclined in the opposite directions from the system optical axis at the same predetermined angle. Accordingly, the combining mirror may be formed into an orthogonal shape, which is easy in adjustment in angle and setting, and the luminous fluxes from the both lamps may be combined with an inclination of the predetermined angle so as to be superimposed with each other even though the configuration is relatively simple, so that improvement of the efficiency of light utilization is achieved.

Preferably, the combining mirror includes first and second mirror panels which form the first and second reflection surfaces respectively, and the edge is formed by abutting an end portion of the first mirror panel and an end portion of the second mirror panel. In this configuration, the first and second reflection surfaces for combining incident lights may be formed relatively easily by the first and second mirror panels.

Preferably, the first and second mirror panels each include a pair of parallel main planes which constitute a front surface and a back surface respectively, and end surfaces formed vertically to the main planes at end portions of the main planes, and the edge is formed by bringing the end surface of one of the first and second mirror panels into abutment with a portion of the main plane of the other mirror panel adjacent to the end surface of the other mirror panel. In this configuration, formation of a gap or the like around the edge is prevented, and the first reflection surface and the second reflection surface can easily be set vertically to each other.

Preferably, the first and second mirror panels form the edge by bringing inclined surfaces formed by chamfering the end portions thereof by an angle of 45° into abutment with each other. In this configuration, an angle formed between the first reflection surface and the second reflection surface may be set to 90°, that is, the both reflection surfaces may be set to be vertical to each other by bringing the inclined surfaces into abutment with each other.

Preferably, the combining mirror includes a supporting member configured to support the first and second mirror panels in a state of being orthogonal to each other. In this configuration, the first and second mirror panels are stably and reliably maintained in an orthogonal state by the supporting member.

Preferably, the combining mirror includes the first and second reflection surfaces each formed of a dielectric multilayer film. In this configuration, advantages not only such that a high reflectance ratio is secured, but also such that only the light in a wavelength range zone required for illumination, for example, is extracted as the illumination light are achieved.

Preferably, the illumination apparatus further including a parallelizing optical system configured to parallelize a combined luminous flux and a uniformizing optical system configured to uniformize the luminous flux having passed through the parallelizing optical system in downstream of an optical path from the combining mirror are further provided. In this configuration, the light is uniformized after having parallelized, so that the illumination apparatus suitable for being built in a projector or the like, for example, is achieved.

According to a second aspect of the invention, there is provided a projector including: an illumination apparatus according to the first aspect of the invention; a light modulation device to be illuminated by an illumination light from the illumination apparatus; and a projection system configured to project an image light having passed through the light modulation device. In this configuration, the projector is enabled to project images improved in luminance as a result of the improvement of the efficiency of light utilization by using the illumination apparatus described above.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
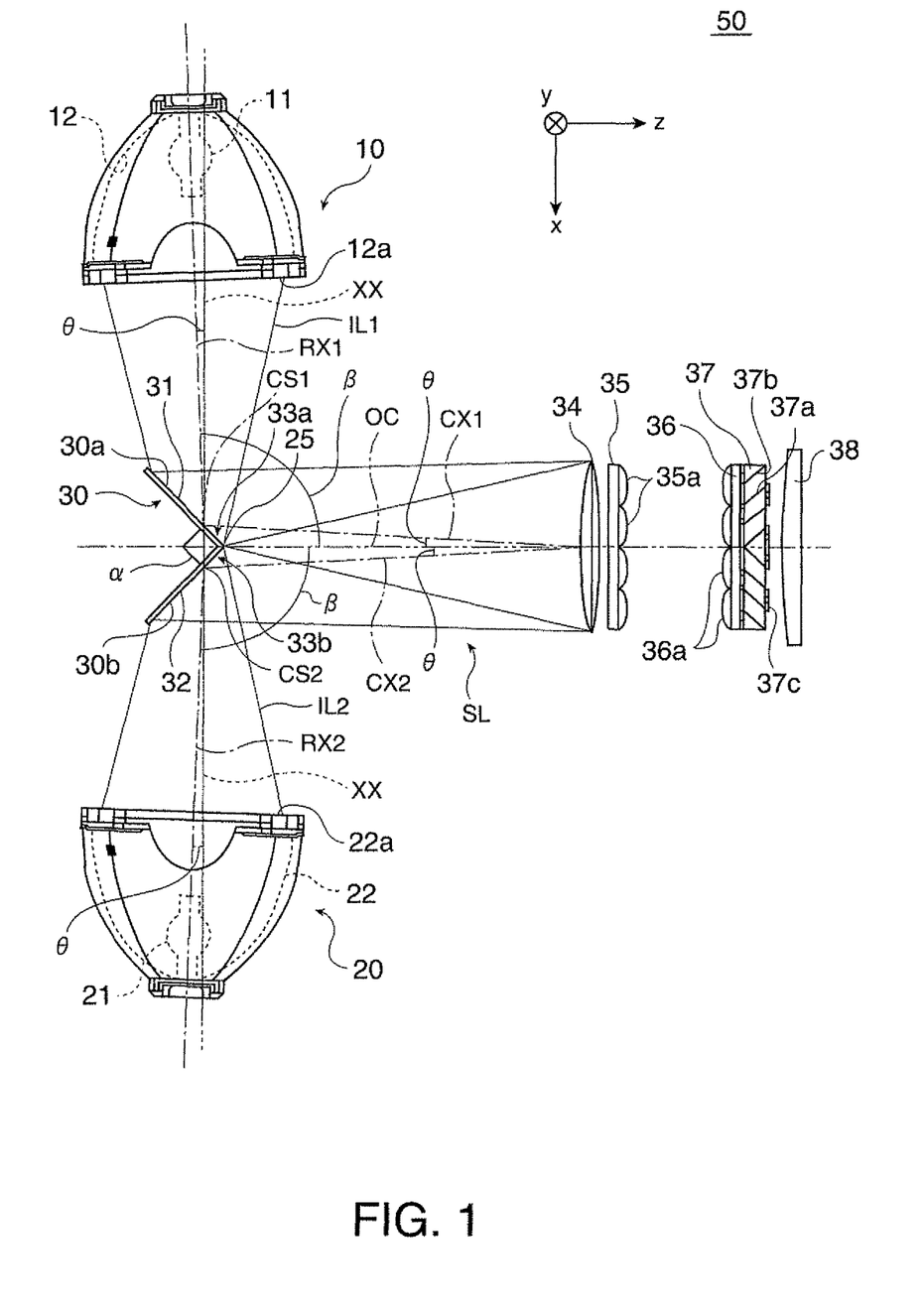
FIG. 1 is an explanatory plan view showing an illumination apparatus according to a first embodiment.

FIG. 1 is a plan view conceptually showing an illumination apparatus according to a first embodiment. An illumination apparatus 50 according to the first embodiment includes first and second light source lamp units 10 and 20, as lamps each configured to generate a light source light, a combining mirror 30 configured to combine emitted lights IL1 and IL2 from the first and second light source lamp units 10 and 20 by reflecting the same in the substantially same direction, a parallelizing optical system 34 which is a lens configured to parallelize an illumination light SL combined by the combining mirror 30 into a single illumination light SL, first and second fly-eye lenses 35 and 36 configured to split the parallelized luminous flux into a plurality of partial luminous fluxes and adjust a diverging angle of the partial luminous fluxes, a polarization conversion element 37 configured to adjust the state of polarization of the illumination light passed through the second fly-eye lens 36, and a superimposing lens 38 configured to superimpose the plurality of partial luminous fluxes in downstream of an optical path.

As shown in FIG. 1, the first and second light source lamp units 10 and 20 of the illumination apparatus 50 include first and second arc tubes 11 and 21 as light-emitting sources configured to generate light source lights each including a visible light wavelength range and first and second reflectors 12 and 22 as reflection members configured to reflect the light source lights generated from the first and second arc tubes 11 and 21, respectively. The first light source lamp unit 10 and the second light source lamp unit 20 are optical systems having the same structure, and are arranged in symmetry with respect to a system optical axis OC of the entire illumination apparatus 50. Each of the arc tubes 11 and is, for example, a high-pressure discharge lamp such as a high-pressure mercury lamp, which generates a light source light of a substantially white color having a sufficient quantity of light to form an image light when using an image display apparatus, for example, such as a projector. The respective reflectors 12 and 22 reflect light source lights generated from the first and second arc tubes 11 and 21 and output the same from outgoing surfaces 12a and 22a. The light source lights going out respectively from the outgoing surfaces 12a and 22a of the reflectors 12 and 22 are condensed toward the combining mirror 30 as the emitted lights IL1 and IL2. In this case, the emitted lights IL1 and IL2 go out with optical axes RX1 and RX2 of the respective light source lamp units 10 and 20 as center axes thereof.

The combining mirror 30 includes a pair of first and second mirror panels 31 and 32. The first and second mirror panels 31 and 32 both have the same structure having a rectangular shape in plan view, and is arranged so as to oppose the first and second light source lamp units 10 and 20 in symmetry with respect to the system optical axis OC. The first mirror panel 31 has a first reflection surface 30a corresponding to the emitted light IL1 from the first light source lamp unit 10 on the front side thereof, and the second mirror panel 32 has a second reflection surface 30b corresponding to the emitted light IL2 from the second light source lamp unit 20 on the front side thereof. The combining mirror 30 is formed with an edge 25 by bringing an end portion 33a of the first mirror panel 31 and an end portion 33b of the second mirror panel 32 into abutment with each other. At this time, an angle α formed between the first mirror panel 31 and the second mirror panel 32 is a right angle (the structure of the combining mirror 30 will be described later with reference to FIG. 2).

An arrangement of the first and second lamp units 10 and 20 and the combining mirror 30 in the illumination apparatus 50 will be described. The combining mirror 30 from among these members is arranged in such a manner that the respective reflection surfaces 30a and 30b are arranged in symmetry with respect to the system optical axis OC as a reference of the entire illumination apparatus 50 in FIG. 1. The first and second lamp units 10 and 20 are also arranged in symmetry with respect to the system optical axis OC so as to oppose the respective reflection surfaces 30a and 30b. Here, as shown in FIG. 1, a direction of extension of the system optical axis OC is defined as a z-direction, and a direction vertical to the z-direction in a plane parallel to a paper plane of FIG. 1 is defined as an x-direction. A direction vertical to the x-direction and the z-direction is defined as a y-direction. An xz plane being a plane parallel to the paper plane of FIG. 1 and including the system optical axis OC and the optical axes RX1 and RX2, described later, is defined as a reference plane. An axis being orthogonal to the system optical axis OC in the reference plane and intersecting the lamp units 10 and 20 at intersection points CS1 and CS2 on the respective reflection surfaces 30a and 30b is defined as a reference axis XX.

In the combining mirror 30, the respective reflection surfaces 30a and 30b, which are main planes of the first and second mirror panels 31 and 32 on one side are both vertical to the reference plane (xz plane). As described above, the first reflection surface 30a and the second reflection surface 30b are arranged in symmetry with respect to the system optical axis OC, and are orthogonal to each other to form the edge 25. Consequently, a ridge line of the edge 25, which corresponds to a distal end portion of the combining mirror 30, extends orthogonal to the system optical axis OC and extends in the y-direction. In the plan view in FIG. 1, the respective reflection surfaces 30a and 30b incline with respect to the system optical axis OC by 45°, respectively.

In contrast, the first and second lamp units 10 and 20 are arranged in such a manner that both the optical axes RX1 and RX2 of the lamp units 10 and 20 are inclined from the reference axis XX by an angle θ in the reference plane (xz plane). In other words, the optical axis RX1 of the first lamp 10 extends in a direction inclined from the reference axis XX by the angle θ in a positive angular direction, that is, counter-clockwise about the intersection point CS1 on the paper plane of FIG. 1, and the optical axis RX2 of the second lamp 20 extends in a direction inclined from the reference axis XX by the same predetermined angle θ in a negative angular direction, that is, clockwise about the intersection point CS2 in the paper plane of FIG. 1. Therefore, in this case, both the optical axes RX1 and RX2 of the first and second lamp units 10 and 20 do not intersect the system optical axis OC orthogonally, and an angle β formed between the optical axes RX1 and RX2 and the system optical axis OC is 90°+θ, that is, approximately 92°. Although the value of the angle θ here is determined to be approximately 2°, the invention is not limited thereto, and may be an adequate minute angle according to the relation with respect to the optical systems such as the parallelizing optical system 34 located downstream of the optical path described later.

With the arrangement of the first and second lamp units 10 and 20 and the combining mirror 30 as described above, the optical axes RX1 and RX2 of the light source lamp units 10 and 20 are redirected at the respective reflection surfaces 30a and 30b, and center axes CX1 and CX2 corresponding to the optical axes RX1 and RX2 after having been redirected are respectively inclined with respect to the system optical axis OC by the angle θ. In other word, both the emitted lights IL1 and IL2 reflected by the combining mirror 30 go out along the system optical axis OC in a state of being inclined by the angle θ. In this manner, the emitted lights IL1 and IL2 coming from opposed directions are reflected by the combining mirror 30 to the substantially same direction and combined although a minute angle 2θ is formed therebetween, so that the illumination light SL is formed.

Figure 2:
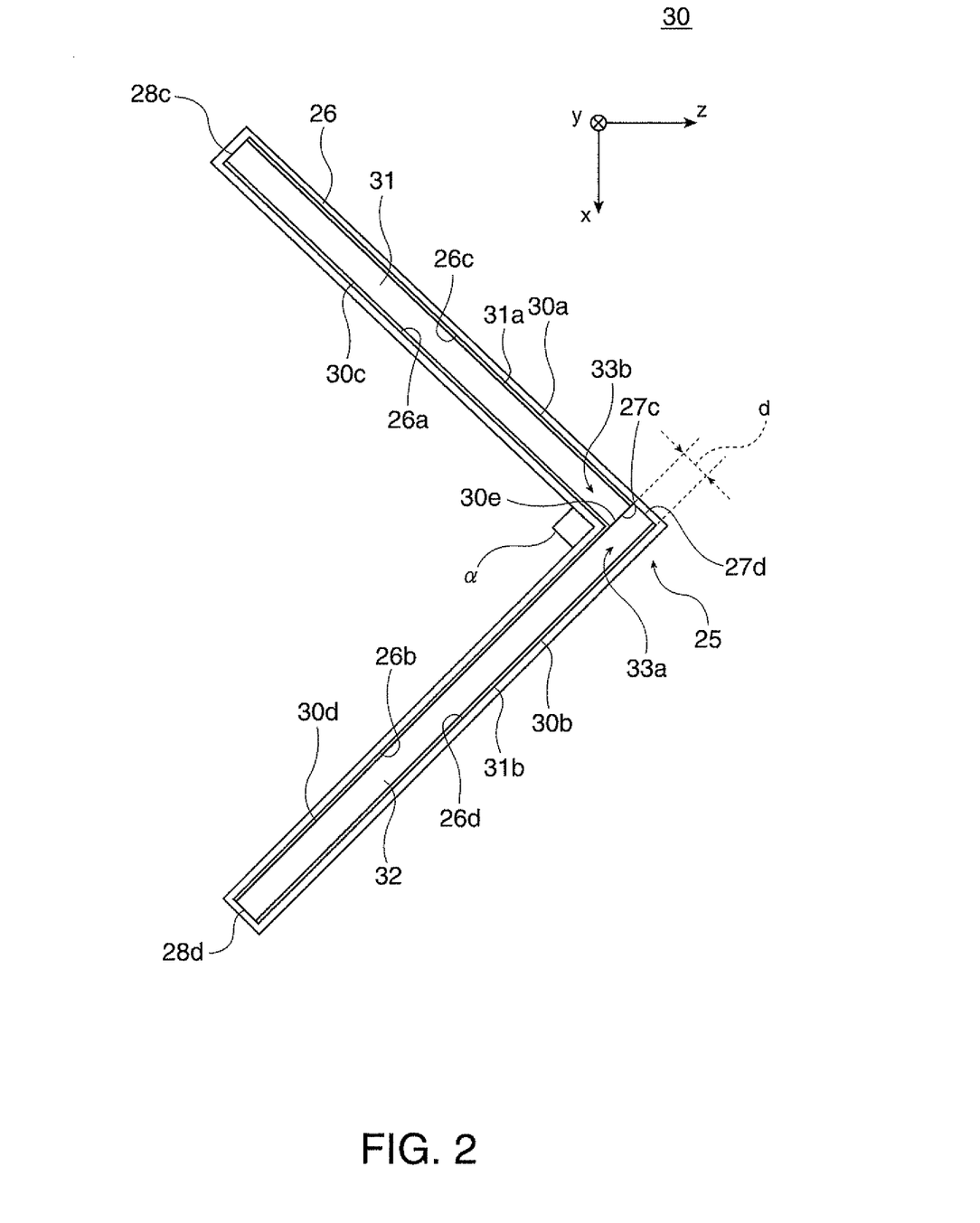
FIG. 2 is an explanatory conceptual drawing showing a combining mirror of the illumination apparatus.

Referring now to FIG. 2, the structure of the combining mirror 30 shown in the illumination apparatus 50 will be described in detail. The combining mirror 30 includes holder 26 which is a supporting member configured to support the first mirror panel 31 having the first reflection surface 30a and the second mirror panel 32 having the second reflection surface 30b.

The first and second mirror panels 31 and 32 each are a mirror of a rectangular shape in plan view, and are fixed by the holder 26 so as to be vertical to each other. More specifically, the mirror panels 31 and 32 have the reflection surfaces 30a and 30b respectively as the front surfaces, and back surfaces 30c and 30d on the opposite sides of the respective reflection surfaces 30a and 30b. The reflection surfaces 30a and 30b are formed of reflection layers 31a and 31b formed on the front sides of the mirror panels 31 and 32 by deposition or the like. The first mirror panel 31 includes end surfaces 27c and 28c formed vertically to the surfaces 30a and 30c, that is, to the main planes. In the same manner, the second mirror panel 32 includes end surfaces 27d and 28d formed vertically to the surfaces 30b and 30d, that is, to the main planes. The combining mirror 30 is formed with the edge 25 by bringing the end surface 27c on the distal end side of the first mirror panel 31 from among end surfaces 27c, 27d, 28c, and 28d of the mirror panels 31 and 32 into abutment with a portion 30e on the back surface 30d of the second mirror panel 32 adjacent to the end surface 27d. In this case, since the mirror panels 31 and 32 are formed into a rectangular shape in plan view, the formed edge 25 forms a right angle without formation of any gap or the like. Accordingly, the angle α formed between the first reflection surface 30a and the second reflection surface 30b is also vertical.

The holder 26 is configured to be attached using peripheral edge portions provided out of effective areas as the reflection surfaces 30a and 30b of the first and second mirror panels 31 and 32. The holder 26 is provided as a member having a pair of the same structures on an upper side and a lower side of the peripheral edge portions of the mirror panels 31 and 32 in the y-direction, and the both mirror panels 31 and 32 are aligned and fixed by the cooperation of the both members. The holder 26 includes a first guide groove 26a and a second guide groove 26b for inserting the respective mirror panels 31 and 32. Although not shown in the drawing, the holder 26 is configured to apply an adequate force to the mirror panels 31 and 32 from the back surfaces 30c and 30d side by an urging spring or the like to cause the reflection surfaces 30a and 30b to be pressed against guide surfaces (alignment surface) 26c and 26d of the holder 26 without deforming the mirror panels 31 and 32, so that the both mirror panels 31 and 32 assume an angled form. Although not shown in the drawing, the holder 26 is configured to apply an adequate force also in the direction from the end surfaces 28c and 28d of the mirror panels 31 and 32 toward the edge 25 using an urging spring or the like, so that the mirror panels 31 and 32 are maintained in the angled form. With the holder 26 configured as described above, the mirror panels 31 and 32 are fixed in a state in which the reflection surface 30a and the reflection surface 30b are vertical to each other without causing displacement or deformation etc. even thought they are relatively thin.

The first and second mirror panels 31 and 32 are preferably formed of films having desired reflection characteristics on the entire surfaces thereof as reflection layers 31a and 31b in advance before assembling the mirror panels 31 and 32 with the holder 26. In this case, formation of the reflection layer in the vicinity of the edge 25 after having formed the edge 25 is not necessary. Therefore, for example, the reflection layers 31a and 31b of a dielectric multilayer film may be formed by deposition or the like. Employment of the dielectric multilayer film provides advantages not only such that a high reflectance ratio is secured on the reflection surfaces 30a and 30b, which are the surfaces of the reflection layers 31a and 31b, but also such that only components of a visible light wavelength range zone required for the illumination light SL, for example, can be extracted. A thickness d of the mirror panels 31 and 32 of the combining mirror 30 may be as extremely thin as approximately 0.7 mm, for example. In this case, since the quantity of light which is rejected by the end surface 27d when being combined by the combining mirror 30 is very small even though the reflection layer is not formed on the end surface 27d by deposition, the illumination light SL formed by the combining mirror 30 is rarely affected thereby. The illumination light SL formed by the combining mirror 30 having the structure as described above enters the parallelizing optical system 34 positioned downstream of the optical path of the combining mirror 30.

The parallelizing optical system 34 is a condensing lens configured to combine reflected lights and parallelizes the illumination light SL combined into a single luminous flux by the reflection from the combining mirror 30. The illumination light SL going out from the parallelizing optical system 34 enters the first and second fly-eye lenses 35 and 36 as a uniformizing optical system in a substantially parallelized state.

The first and second fly-eye lenses 35 and 36 include a plurality of element lenses 35a and 36a arranged in a matrix pattern, respectively, and these element lenses 35a and 36a split the light parallelized by passing the parallelizing optical system 34 and condense and diverge the individuals. More specifically, the first fly-eye lens 35 has a function as a luminous flux splitting optical element configured to split the luminous flux of the light passing through the parallelizing optical system 34 into a plurality of partial luminous fluxes, and includes the above-described plurality of element lenses 35a in a plane orthogonal to the system optical axis OC. The second fly-eye lens 36 is an optical element configured to adjust the diverging angles of the plurality of partial luminous fluxes split by the above-described first fly-eye lens 35. The second fly-eye lens 36 includes the plurality of element lenses 36a described above in a plane orthogonal to the system optical axis OC in the same manner as the first fly-eye lens 35. The contour shape of each of the element lenses 35a of the first fly-eye lens 35 is, when the illumination apparatus 50 is built in a liquid crystal-type projector, set to have a shape substantially similar to the shape of illuminated areas (effective pixel areas on which image data is formed) on liquid crystal panels of the projector. In contrast, the element lenses 36a of the second fly-eye lens 36 are intended to adjust the diverging angles, the contour shape of the respective element lenses do not have to correspond to the illuminated areas of the liquid crystal panels described above.

As described above, the illumination light SL formed via the first and second fly-eye lenses 35 and 36 enters the polarization conversion element 37. The polarization conversion element 37 includes a PBS array, and has a role to align the directions of polarization of the respective partial luminous fluxes split by the first fly-eye lens 35 into linearly polarized lights proceeding in one direction. The structure of the polarization conversion element 37 will be described in detail. The polarization conversion element 37 has a configuration in which polarization separation layers 37a and reflection mirrors 37b arranged obliquely with respect to the system optical axis OC and alternately. The former polarization separation layers 37a transmit one of a P-polarized luminous flux and an S-polarized luminous flux contained in the respective partial luminous fluxes, and reflect the other one of those. The other reflected polarized luminous flux is redirected in its optical path by the latter reflection mirrors 37b, and goes out in an outgoing direction of the one polarized luminous flux, that is, in the direction along the system optical axis OC. Either one of the outgoing polarized luminous fluxes is converted in polarization by a retardation film 37c provided on the outgoing surface of the luminous flux of the polarization conversion element 37 in a strip pattern, whereby the directions of polarization of all the polarized luminous fluxes are aligned. By employing such the polarization conversion element 37, the luminous fluxes going out from the illumination apparatus 50 are aligned as the polarized luminous fluxes in one direction.

The superimposing lens 38 is a superimposing optical element configured to condense the plurality of partial luminous fluxes passed through the first fly-eye lens 35, the second fly-eye lens 36, and the polarization conversion element 37 and cause the same to enter a predetermined illuminated area while being superimposed thereon. For example, when the illumination apparatus 50 is used as a light source of the liquid crystal type projector, image forming areas of the liquid crystal panels are uniformly illuminated.

As described above, in the illumination apparatus 50, with the optical axes RX1 and RX2 of the light source lamp units 10 and 20 inclined with respect to the reference axis XX, even when the angle between the reflection surface 30a and the reflection surface 30b of the combining mirror 30 are a right angle, the emitted lights IL1 and IL2 emitted therefrom may be caused to enter the respective optical systems in downstream of the optical path as the illumination lights in a state in which the center axes CX1 and CX2 after being reflected from the combining mirror 30 are inclined by the predetermined angle θ (approximately 2°) with respect to the system optical axis OC. Accordingly, for example, both the two emitted lights IL1 and IL2 are able to form an ark image in the each element lens 36a of the second fly-eye lens 36, whereby the efficiency of light utilization is improved. In addition, what is essential is just to fabricate the reflection surface 30a and the reflection surface 30b of the combining mirror 30 in the vertical state, and hence the fabrication of the reflection surfaces is achieved relatively easily. Further, fabrication at a lower cost is achieved in comparison with the case where the combining mirror 30 is formed of a prism, and a heat discharging effect of the combining mirror 30 may be increased in comparison with the case of fabricating a mirror on the surface of the prism by making the thickness of the mirror panels 31 and 32 relatively thin.

Figure 3:
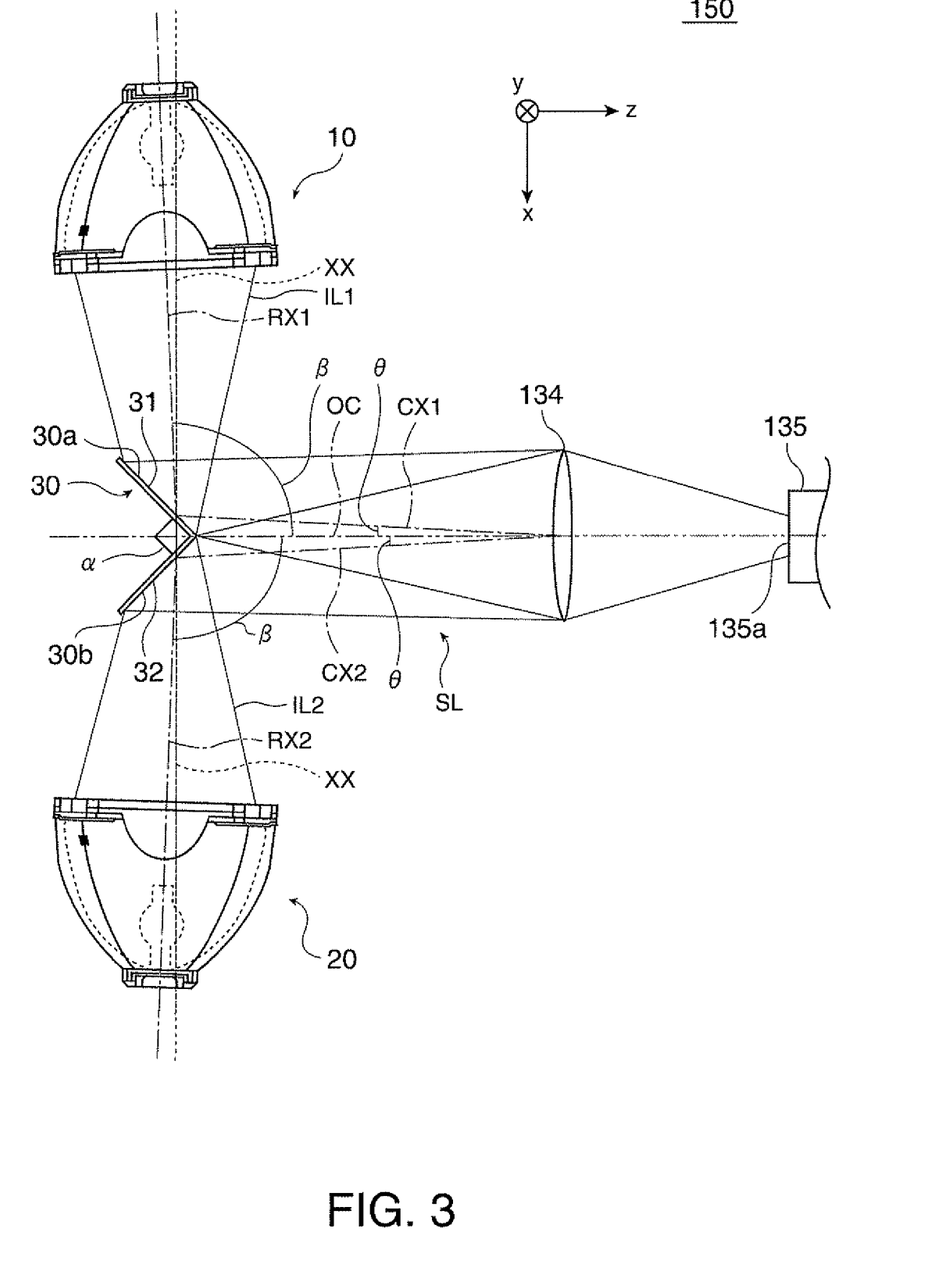
FIG. 3 is an explanatory plan view showing a modification of the illumination apparatus.

FIG. 3 is an explanatory plan view showing a modification of the illumination apparatus in the first embodiment. An illumination apparatus 150 in this modification is different only in downstream of the optical path from the combining mirror 30, and hence detailed description of the first and second lamp units 10 and 20 and the combining mirror 30 will be omitted.

The illumination apparatus 150 is an illumination apparatus of a type employing a rod integrator, and includes a condensing lens 134 configured to condense the illumination light SL and a rod integrator 135 configured to uniformize the light condensed by the condensing lens 134 as optical systems in downstream of the first and second lamp units and the combining mirror 30. In other words, in the illumination apparatus 150, the condensing lens 134 causes the illumination light SL emitted from the respective light source lamp units 10 and 20 and combined by the combining mirror 30 to enter an incident surface 135a of the rod integrator 135 in a state of being condensed thereon. The rod integrator 135 uniformizes the illumination light SL entering from the incident surface 135a by repetition of an internal reflection. The illumination apparatus 150 can also be used as the illumination apparatus of, for example, the liquid crystal type projector or the like. For example, although not shown in the drawing, it is also possible to cause the illumination apparatus 150 to function as the illumination apparatus for the liquid crystal type projector by arranging liquid crystal panels via an image forming lens or the like in downstream of the optical path from the rod integrator 135.

Figure 4:
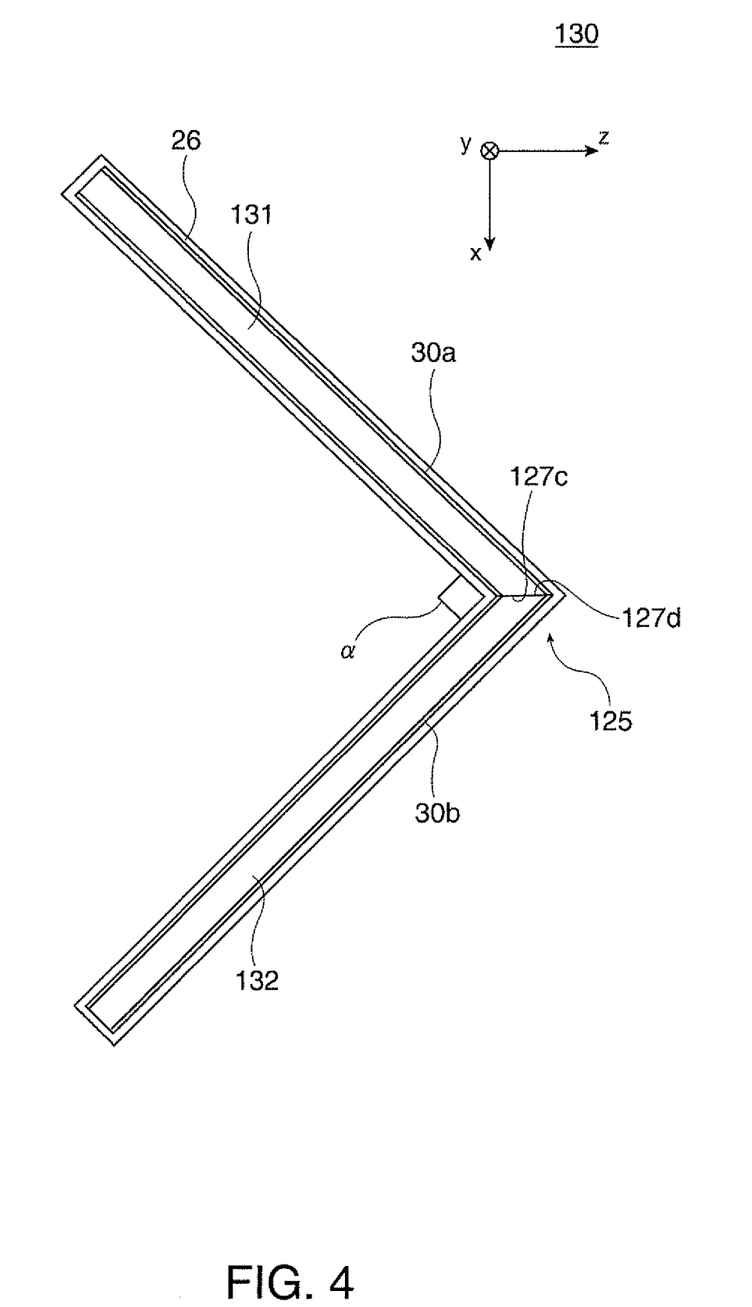
FIG. 4 is an explanatory conceptual plan view showing a modification of the combining mirror.

A combining mirror 130 shown in FIG. 4 is a modification of the combining mirror 30 shown in FIG. 2, and may be used instead of the combining mirror 30 used in the illumination apparatuses 50 and 150 shown in FIGS. 1 and 3. Since the shape and the function of the combining mirror 130 are the same as the combining mirror 30 in FIG. 2 except for end portions of mirror panels 131 and 132 which form an edge 125, description of the structure other than the corresponding end portions will be omitted.

In the combining mirror 130, the first and second mirror panels 131 and 132 include inclined surfaces 127c and 127d formed by chamfering end portions on the side of distal ends which form the edge 125 by 45°, respectively, and the edge 125 is formed by bringing the inclined surfaces 127c and 127d into abutment with each other. In this case as well, the angle formed between the first reflection surface 30a and the second reflection surface 30b may be set to 90°, so that the surfaces thereof may be set to be vertical to each other. In this case as well, in the same manner as the case shown in FIG. 2, the vertical state is maintained easily and reliably by the holder 26.

Second Embodiment

Figure 5:
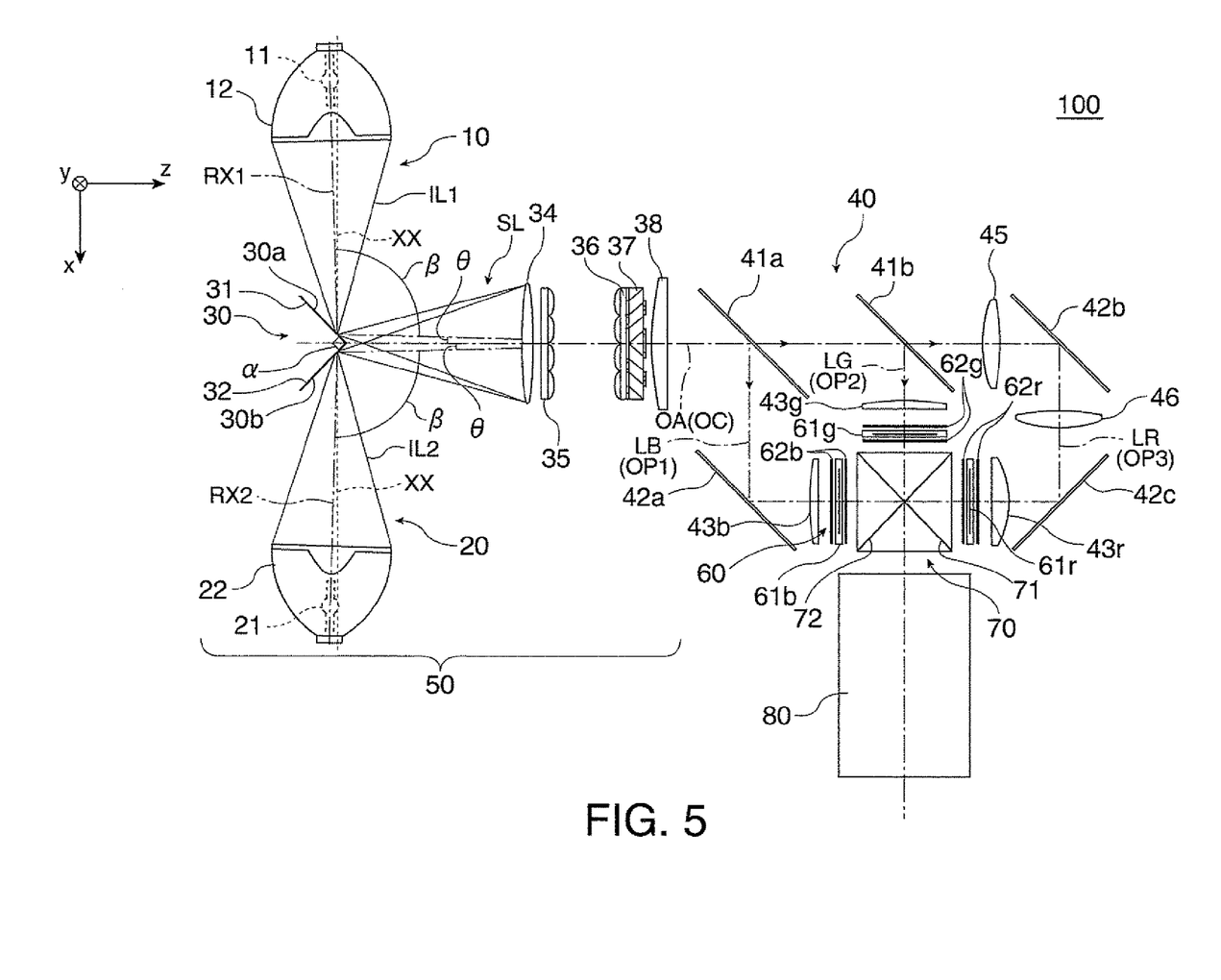
FIG. 5 is an explanatory conceptual drawing showing a projector employing the illumination apparatus.

FIG. 5 is a drawing showing a projector according to a second embodiment. More specifically, it is an explanatory conceptual plan view showing a projector 100 in which the illumination apparatus 50 shown in FIG. 1 in the first embodiment is integrated.

The projector 100 includes the illumination apparatus 50 configured to form and emit an illumination light, a color separation system 40 configured to split the illumination light from the illumination apparatus 50 into three colors; blue (B), green (G), and red (R), a light modulation unit 60 configured to form image lights in respective colors, a cross dichroic prism 70 configured to form a color image light by combining the image lights in the respective colors going out from the light modulation unit 60, and a projection system 80 configured to project the image light passed through the cross dichroic prism 70.

Repeated description of the illumination apparatus 50 is omitted since it is already described in the first embodiment, and respective configurations of the projector 100 arranged in downstream of the optical path of the illumination apparatus 50 will be described below. When the illumination apparatus 50 is used, a luminous flux going out from the superimposing lens 38 is uniformized by superimposition and goes out toward the color separation system 40 in downstream of the optical path. In other words, the illumination light passing through the both fly-eye lenses 35 and 36 and the superimposing lens 38 passes through the color separation system 40 described in detail below, and illuminates illuminated areas of the light modulation unit 60 uniformly, that is, image forming areas of liquid crystal panels 61b, 61g, and 61r in the respective colors. Since the polarization conversion element 37 of the illumination apparatus 50 is able to align the luminous fluxes to go out therefrom into the polarized luminous fluxes in one direction, so that improvement of the efficiency of utilization of the light used in the light modulation unit 60 described later is achieved. As shown in FIG. 5, the system optical axis OC of the illumination apparatus 50 is assumed to match a system optical axis OA of the entire projector 100 from the superimposing lens 38 to the color separation system 40.

The color separation system 40 includes first and second dichroic mirrors 41a and 41b, reflection mirrors 42a, 42b, and 42c, field lenses 43b, 43g, and 43r, and relay lenses 45 and 46. The first and second dichroic mirrors 41a and 41b out of these members split the illumination light into three luminous fluxes of a blue (B) light, a green (G) light, and a red (R) light. The dichroic mirrors 41a and 41b each are an optical element obtained by forming a dielectric multilayer film having a wavelength selecting function such as to reflect luminous fluxes having a predetermined wavelength range and transmit luminous fluxes having other wavelength ranges on a transparent substrate, and are arranged in a state of being inclined with respect to the system optical axis OA of the projector 100. The first dichroic mirror 41a reflects a blue light LB out of the three colors; B, G, and R, and transmits a green light LG and a red light LR. The second dichroic mirror 41b reflects the green light LG from between the incoming green light LG and the red light LR and transmits the red light LR. The field lenses 43b, 43g, and 43r for the respective colors provided on the outgoing side of the color separation system 40 are provided in such a manner that the respective partial luminous fluxes going out from the second fly-eye lens 36 and entering the light modulation unit 60 has an adequate degree of convergence or a degree of divergence with respect to the system optical axis OA. A pair of the relay lenses 45 and 46 are arranged on a third optical path OP3 for the red color which is relatively longer than a first optical path OP1 for the blue color or a second optical path OP2 for the green color. The pair of relay lenses 45 and 46 transmit an image formed immediately before the first relay lens 45 on the incident side to the field lens 43r on the outgoing side as is, so that lowering of the efficiency of light utilization due to the divergence or the like of the light is prevented.

In the color separation system 40, the illumination light SL emitted from the illumination apparatus 50 firstly enter the first dichroic mirror 41a. The blue light LB reflected from the first dichroic mirror 41a is guided to the first optical path OP1, and enters the field lens 43b via the reflection mirror 42a. The green light LG transmitted through the first dichroic mirror 41a and reflected from the second dichroic mirror 41b is guided to the second optical path OP2 and enters the field lens 43g. Further, the red light LR passed through the second dichroic mirror 41b is guided to the third optical path OP3, and enters the field lens 43r via the reflection mirrors 42b and 42c and the relay lenses 45 and 46.

The light modulation unit 60 includes the three liquid crystal panels 61b, 61g, and 61r to which the colored illumination lights LB, LG, and LR enter respectively, and three sets of polarization filters 62b, 62g, and 62r arranged so as to interpose the respective liquid crystal panels 61b, 61g, and 61r. Here, for example, the liquid crystal panel 61b for the blue light LB and a pair of the polarization filters 62b and 62b which interpose the same constitute a liquid crystal light valve for two-dimensionally modulate the luminance of the illumination light on the basis of image data. In the same manner, the liquid crystal panel 61g for the green light LG and the polarization filters 62g and 62g corresponding thereto constitute a liquid crystal light valve, and the liquid crystal panel 61r for the red light LR and the polarization filters 62r and 62r constitute a liquid crystal light valve. The liquid crystal panels 61b, 61g, and 61r each are formed by hermetically encapsulating liquid crystal as photoelectric material between a pair of transparent glass substrates and, for example, modulate the direction of polarization of the polarized luminous flux entering thereto according to a given image signal, with a polysilicon TFT as a switching element.

In the light modulation unit 60, the blue light LB guided to the first optical path OP1 illuminates the image forming area in the liquid crystal panel 61b via the field lens 43b. The green light LG guided to the second optical path OP2 illuminates the image forming area in the liquid crystal panel 61g via the field lens 43g. The red light LR guided to the third optical path OP3 illuminates the image forming area in the liquid crystal panel 61r via the first and second relay lenses 45 and 46, and the field lens 43r. The liquid crystal panels 61b, 61g, and 61r each are non-emitting transmissive light modulation devices configured to change spatial distribution of the direction of polarization of the incoming illumination light. The illumination lights in three colors LB, LG, and LR entering the liquid crystal panels 61b, 61g, and 61r respectively are adjusted in the state of polarization on the pixel-by-pixel bass according to driving signals or control signals supplied to the respective liquid crystal panels 61b, 61g, and 61r as electric signals. At that time, the direction of polarization of the illumination lights entering the respective liquid crystal panels 61b, 61g, and 61r by the polarization filters 62b, 62g, and 62r is regulated, and modulated lights having predetermined directions of polarization are extracted from the lights going out from the liquid crystal panels 61b, 61g, and 61r. With the procedure as described above, image lights in respective colors are formed by the corresponding liquid crystal panels 61b, 61g, and 61r and the polarization filters 62b, 62g, and 62r.

The cross dichroic prism 70 is a light combining optical system configured to combine the image lights going out from the respective liquid crystal panels 61b, 61g, and 61r and modulated separately for the respective color lights and form a color image. The cross dichroic prism 70 is formed into a substantially square shape in plan view by bonding four rectangular prisms, and a pair of dielectric multilayer films 71 and 72 intersecting into an X-shape are formed at interface of bonded rectangular prisms. The first dielectric multilayer film reflects the blue light and the second dielectric multilayer film 72 reflects the red light. The cross dichroic prism 70 reflects the blue light LB from the liquid crystal panel 61*b* by the first dielectric multilayer film 71 to cause the same to go out on the right side of the direction of travel, cause the green light LG from the liquid crystal panel 61*g* to proceed straight ahead and go out via the first and second dielectric multilayer films 71 and 72, and reflects the red light LR from the liquid crystal panel 61*r* by the second dielectric multilayer film 72 to cause the same to go out on the left side of the direction of travel.

The image light combined by the cross dichroic prism 70 passes through the projection system 80 as an expanded projection lens and is projected on a screen (not shown) at an adequate enlargement ratio as the color image.

As described thus far, the projector 100 according to the second embodiment is able to project a high-intensity light by using the illumination apparatus having the structure shown in FIG. 1 and other drawings in the first embodiment as a light source. Therefore, adequate illuminations on the liquid crystal panels 61*b*, 61*g*, and 61*r* are enabled, and a high-luminance image can be projected.

The invention is not limited to the embodiments described above, and may be implemented in various modes without departing the scope of the invention. For example, following modifications are also applicable.

Although the combining mirror 30 is made up of two mirror panels 31 and 32 in the illumination apparatus according to the embodiments described above, the combining mirror 30 may be made up of a prism if problems such as heat generation do not occur. In other words, a prism having reflecting surfaces as the combining mirror 30 may be formed by cutting out a large prism along planes vertical to each other. In this case, four prisms having the vertical planes are cut out from a single piece of large prism once, and are all able to use as the combining mirror, so that generation of unproductive material is reduced in comparison with angles other than 90°.

Figure 6:
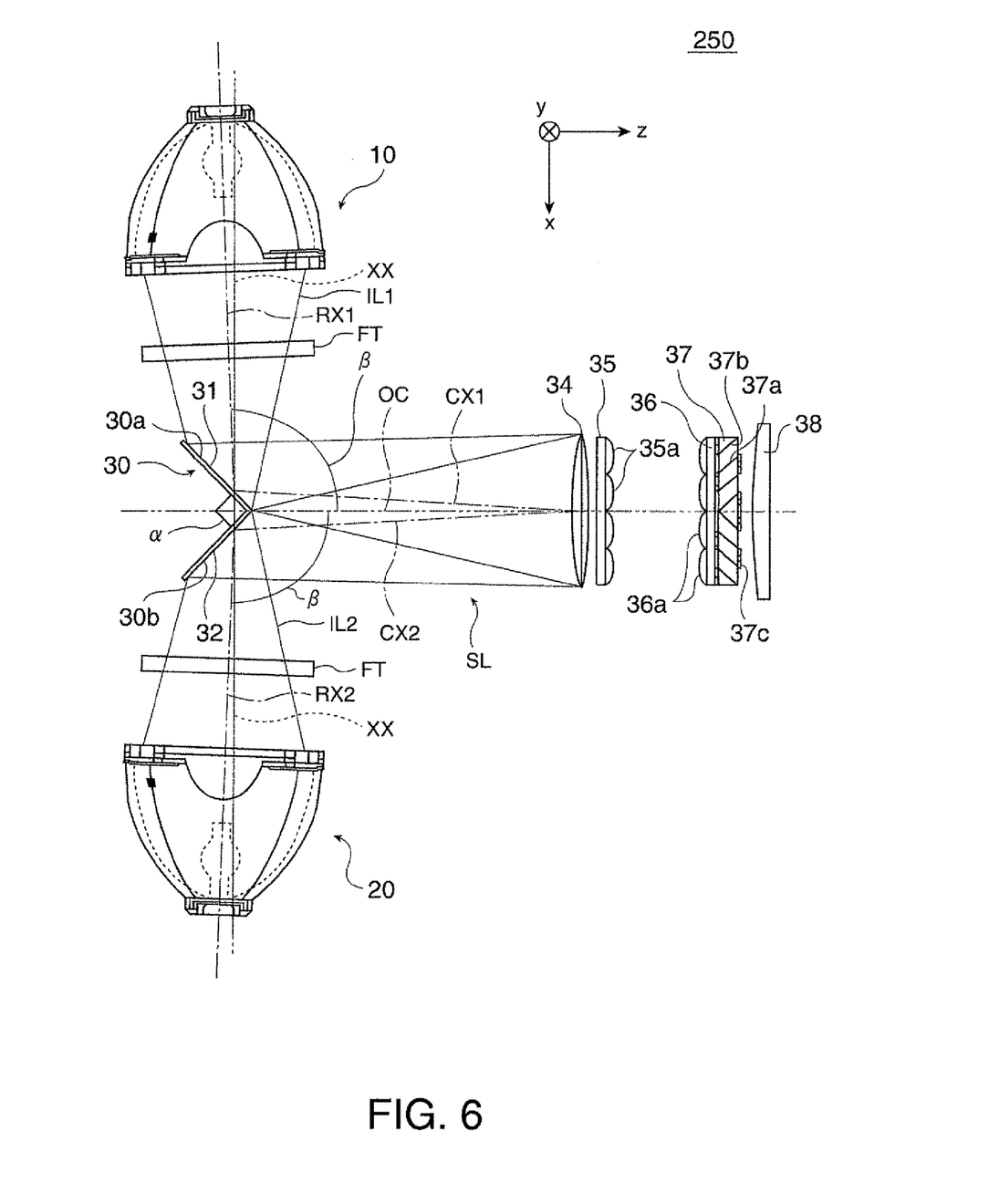
FIG. 6 is an explanatory plan view showing another modification of the illumination apparatus.

As shown in FIG. 6, showing an illumination apparatus 250, light-cut filters FT for removing IR light or UV light may be provided separately between the respective light source lamp units 10 and 20 and the combining mirror 30.

Also, a high-pressure discharge lamp such as a metal halide lamp may be used instead of the high-pressure mercury lamp as the arc tubes 11 and 21 used in the light source lamp units 10 and 20, respectively.

Although the illumination apparatus 50 is made up of the members from the first and second light source lamp units 10 and 20 to the superimposing lens 38 in the embodiments described above, an illumination apparatus including only members from the first and second light source lamp units 10 and 20 to the combining mirror 30, for example, may also be applicable as an illumination apparatus to be put into circulation.

Although the example in which the illumination apparatus 50 is applied to the projector 100 employing the transmissive liquid crystal light valve has been described in the embodiments described above, the illumination apparatus 50 may be applied to a projector employing a reflective liquid crystal light valve.

Although the liquid crystal panels 61*b*, 61*g*, and 61*r* are used as the image forming elements in the light modulation unit 60 in the projector 100 in the embodiment described above, a light modulating device such as a device having pixels made up of micro mirrors or an image forming unit such as a film or a slide is also applicable.

The entire disclosure of Japanese Patent Application No. 2009-006332, filed Jan. 15, 2009 is expressly incorporated by reference herein.

What is claimed is:

1. An illumination apparatus comprising:
 a system optical axis;
 first and second lamps having first and second arc tubes generating lights respectively and first and second reflectors reflecting the lights generated from the first and second arc tubes to condense the lights, the first and second lamp being arranged along a reference plane including the system optical axis in symmetry with respect to the system optical axis; and
 a combining mirror configured to combine emitted lights from the first and second lamps by reflecting the same in substantially the same directions,
 the combining mirror including first and second reflection surfaces opposing the first and second lamps respectively, being oriented vertically with respect to the reference plane, being arranged in symmetry with respect to the system optical axis, and being abutted vertically with respect to each other, whereby forming an edge,
 the combing mirror including first and second mirror panels which form the first and second reflection surfaces respectively, and the edge being formed by abutting an end portion of the first mirror panel and an end portion of the second mirror panel,
 the combing mirror including a supporting member configured to support the first and second mirror panels in a state of being orthogonal to each other, the supporting member being provided as alignment surfaces on one side and on another side of peripheral edge portions of the first and second mirrors, the one side and the another side being positioned along a direction parallel to the edge,
 an optical axis of the first lamp extending in a direction inclined in a positive angular direction at a predetermined angle with respect to a reference axis being orthogonal to the system optical axis on the reference plane and intersecting the optical axes of the first and second lamps on the first and second reflection surfaces, and
 an optical axis of the second lamp extending in a direction inclined in a negative angular direction at the same predetermined angle as the optical axis of the first lamp with respect to the reference axis.

2. The illumination apparatus according to claim 1, wherein the first and second mirror panels form the edge by bringing inclined surfaces formed by chamfering the end portions thereof by an angle of 45° into abutment with each other.

3. The illumination apparatus according to claim 1, wherein the combining mirror includes the first and second reflection surfaces each formed of a dielectric multilayer film.

4. The illumination apparatus according to claim 1, further comprising a parallelizing optical system configured to parallelize a combined luminous flux and a uniformizing optical system configured to uniformize the luminous flux having passed through the parallelizing optical system in downstream of an optical path from the combining mirror.

5. A projector comprising:
 an illumination apparatus according to claim 1;
 a light modulation device to be illuminated by an illumination light from the illumination apparatus; and a projection system configured to project an image light having passed through the light modulation device.

6. The projector according to claim 5, wherein the first and second mirror panels each include a pair of parallel main planes which constitute a front surface and a back surface respectively, and end surfaces formed vertically to the main planes at end portions of the main planes, and the edge is formed by bringing the end surface of one of the first and second mirror panels into abutment with a portion of the main plane of the other mirror panel adjacent to the end surface of the other mirror panel.

7. The projector according to claim 5, wherein the first and second mirror panels form the edge by bringing inclined surfaces formed by chamfering the end portions thereof by an angle of 45° into abutment with each other.

8. The projector according to claim 5, wherein the combining mirror includes the first and second reflection surfaces each formed of a dielectric multilayer film.

9. The projector according to claim 5, further comprising a parallelizing optical system configured to parallelize a combined luminous flux and a uniformizing optical system configured to uniformize the luminous flux having passed through the parallelizing optical system in downstream of an optical path from the combining mirror.

10. The illumination apparatus according to claim 1, wherein the first and second mirror panels each include a pair of parallel main planes which constitute a front surface and a back surface respectively, and end surface formed vertically to the main planes at end portions of the main planes, and the edge is formed by bringing the end surface of one of the first and second mirror panels into abutment with a portion of the main plane of the other mirror panel adjacent to the end surface of the mirror panel.

11. An illumination apparatus comprising:
a system optical axis;
first and second lamps having first and second arc tubes generating lights respectively and first and second reflectors reflecting the lights generated from the first and second arc tubes to condense the lights, the first and second lamps being arranged along a reference plane including the system optical axis in symmetry with respect to the system optical axis; and
a combining mirror configured to combine emitted lights from the first and second lamps by reflecting the same in substantially the same directions,
the combining mirror including first and second reflection surfaces opposing the first and second lamps respectively, being oriented vertically with respect to the reference plane, being arranged in symmetry with respect to the system optical axis, and being abutted vertically with respect to each other, whereby forming an edge,
the combining mirror including first and second mirror panels which form the first and second reflection surfaces respectively, and the edge being formed by abutting an end portion of the first mirror panel and an end portion of the second mirror panel,
the combining mirror including a supporting member configured to support the first and second mirror panels in a state of being orthogonal to each other, the supporting member being provided as alignment surfaces on one side and on another side of peripheral edge along a direction parallel to the edge,
the first and second mirror panels each including a pair of parallel main planes which constitute a front surface and a back surface respectively, and end surfaces being formed perpendicular to the main planes at end portions of the main planes, and the edge being formed by bringing the end surface of one of the first and second mirror panels into abutment with a portion of the main plane of the other mirror panel adjacent to the end surface of the other mirror panel,
an optical axis of the first lamp extending in a direction inclined in a positive angular direction at a predetermined angle with respect to a reference axis being orthogonal to the system optical axis on the reference plane and intersecting the optical axes of the first and second lamps on the first and second reflection surfaces, and
an optical axis of the second lamp extending in a direction inclined in a negative angular direction at the same predetermined angle as the optical axis of the first lamp with respect to the reference axis.

* * * * *